Dec. 29, 1953    R. E. MISENER ET AL    2,664,169
COOKING UTENSIL SPLATTER LID
Filed Jan. 27, 1951

INVENTORS
RICHARD E. MISENER
JOHN W. ABBOTT
STANLEY E. CLARKE
HENRY P. WOODRUFF
BY
Fetherstonhaugh & Co.
ATTORNEYS Patented Dec. 29, 1953

2,664,169

UNITED STATES PATENT OFFICE 2,664,169

COOKING UTENSIL SPLATTER LID

Richard E. Misener, John W. Abbott, Stanley E. Clarke, and Henry P. Woodruff, Vancouver, British Columbia, Canada Application January 27, 1951, Serial No. 208,106

5 Claims. (Cl. 183—1)

This invention relates to a splatter lid for cooking utensils, such as frying pans, griddles and the like.

An object of the present invention is the provision of a lid which may be placed on a cooking utensil in order to prevent moisture and grease from splattering therefrom and yet allowing at least some steam to escape.

Another object is the provision of a lid including a removable cover formed of an absorbent material which may be disposed of after the lid is used.

Yet another object is the provision of a splatter lid for cooking utensils including a dispensable cover formed of absorbent and flame-proof material.

This splatter lid consists of a frame adapted to rest on a cooking utensil, such as a fry pan, griddle or the like, and a cover mounted on the frame sloping downwardly from its centre to the edge of the frame, said frame being shaped to support the cover edge away from the utensil to leave a space through which steam may escape. While this cover may be formed of metal, plastic, or the like, it is preferably formed of an absorbent material, in which case it is removably mounted on the frame so that it may be replaced after each time the lid is used. It is desirable to use a flame-proof material, or to use a material which has been treated to make it flame-proof.

Figure 1:
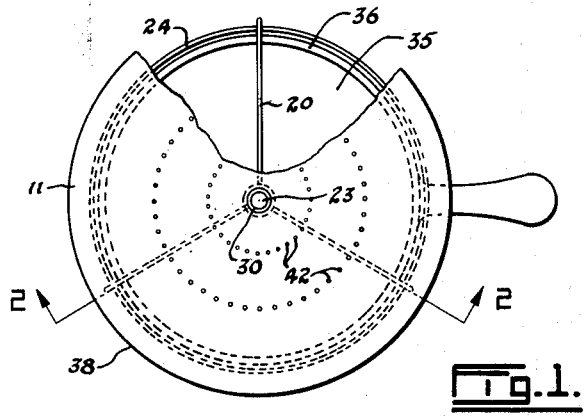
Figure 2:
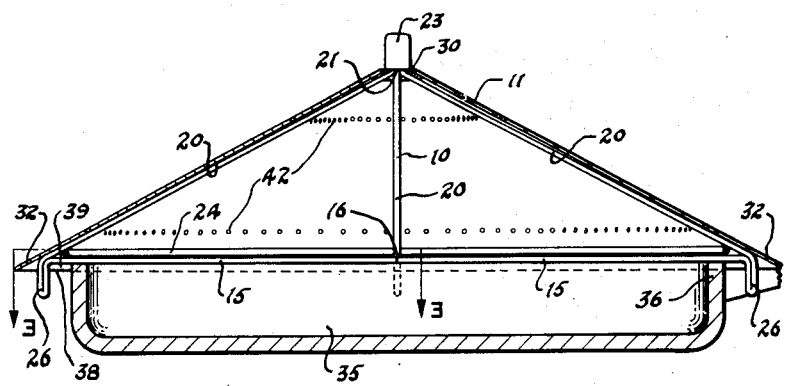
Figures 3, 4:
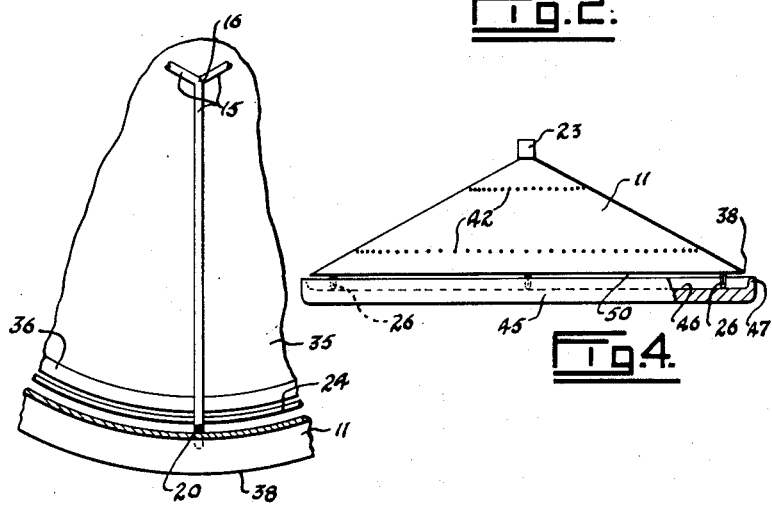

An example of this invention is illustrated in the accompanying drawings, in which, Figure 1 is a plan view of the lid, part of which is broken away in position on a frying pan, Figure 2 is an enlarged section taken on the line 2—2 of Figure 1, Figure 3 is a fragmentary section taken substantially on the line 3—3 of Figure 2, and Figure 4 is a side elevation of the lid positioned on a griddle.

Referring to the drawings, the splatter lid consists mainly of a frame 10 having a cover 11 mounted thereon. This cover may be formed of any suitable material, but it is preferably formed of an absorbent material, in which case it is removably mounted on the frame.

In this example, the frame is formed of wire and it includes a plurality of horizontal bars 15 radiating from the centre of the lid, there being three of these bars shown in the drawings. These bars may be joined together at the centre of the lid as at 16.

A supporting rod 20 is connected to the outer end of each bar 15 and extends inwardly and upwardly therefrom to the centre of the lid. These rods are connected together at their inner and upper ends as at 21. As it is desired to have a knob at this point, a knob 23 may be used to connect these ends together. A circular ring 24 extends over the bars 15 and is connected thereto adjacent the outer ends thereof, see Figures 1 and 2.

The frame described so far is useful for cooking utensils having side walls, such as frying pans. In order to make it useful for flat utensils, such as griddles, the frame may be provided with a plurality of legs 26 projecting downwardly from the bars 15. These legs may be located at the outer ends of the bars and the lower ends of the rods 20. In actual practice, a single piece of wire may be used to form a bar 15, leg 26, and rod 20, as clearly shown in Figure 2. The cover 11 is conical in shape and has a central opening 30 at its apex through which the knob 23 projects when the cover rests on the frame 10. Thus, the cover slopes downwardly from the centre to the edge of the frame and it may extend a short distance beyond said end, as shown at 32 in Figure 2.

In use on a frying pan 35 having a side wall 36, the horizontal bars 15 of the frame rest upon the upper edge of said side wall. As these bars are relatively long, they are able to rest on frying pans of different sizes. When these bars are in position, the edge or rim 38 of the cover is spaced from the utensil wall leaving an opening 39 therebetween through which steam may escape. If desired, the cover may be provided with a plurality of small perforations 42 which will permit a certain amount of steam to escape. The cover 11 prevents any fat or moisture splattering from the frying pan from getting out of the lid. The cover is preferably formed of an absorbent material so that the grease and moisture are absorbed by it instead of running down its inner surface to the rim 38 thereof. If desired, the cover may be formed of flame-proof material, or of an absorbent material which has been treated with a solution to make it flame-proof. A solution has been used for this purpose, the basic ingredient of which is di-ammonium phosphate. After use, the cover 11 may be removed from the frame 10 and disposed of. This eliminates a lot of greasy washing, and the absorbent cover not only prevents the grease from splattering on to the stove and surrounding objects, but it prevents it from dripping on to the stove from the cover rim.

This lid may be used on a large flat cooking utensil, such as a griddle 45, shown in Figure 4. In this case, the legs 26 of the frame rest on the surface 46 of the griddle. The rim 38 of the cover may or may not project beyond the edge 47 of the griddle. In this example, the lid covers the portion of the griddle upon which food is frying. Grease and moisture splattered therefrom is trapped within the lid and is absorbed by the cover 10 if the latter is formed of absorbent material. As the legs support the cover rim above the griddle, there is always a space 50 therebetween through which steam may escape.

The lid may always be easily handled by gripping the knob 23, and it is a simple matter to remove the cover 11 after use and to replace it by another.

What we claim as our invention is:

1. A splatter lid comprising a plurality of horizontal bars radiating from a central point, a supporting rod connected to the outer end of each bar, and extending upwardly and inwardly therefrom, said rods coming together at the inner ends thereof, and a conical cover formed of absorbent material removably mounted on the supporting rods.

2. A splatter lid as claimed in claim 1 including a leg extending downwardly from each bar adjacent the outer end thereof.

3. A splatter lid comprising a plurality of horizontal bars radiating from a central point, a supporting rod connected to the outer end of each bar and extending upwardly and inwardly therefrom, said rods being connected together at the inner ends thereof, a knob projecting upwardly from the inner ends of the rods, and a conical cover formed of absorbent material removably mounted on the supporting rods, said cover having an opening at the apex thereof through which the knob extends.

4. A splatter lid as claimed in claim 3 in which each bar and the supporting rod connected thereto are formed from a single piece of wire, and the wire is bent downwardly and upwardly at the point of connection of the bar and rod to form a leg extending downwardly therefrom.

5. A splatter lid as claimed in claim 3 including a circular ring connected to the bars adjacent the outer ends thereof.

RICHARD E. MISENER.
JOHN W. ABBOTT.
STANLEY E. CLARKE.
HENRY P. WOODRUFF.

References Cited in the file of this patent

UNITED STATES PATENTS

| Number | Name | Date |
| --- | --- | --- |
| 2,568,637 | Jardim | Sept. 18, 1951 |

FOREIGN PATENTS

| Number | Country | Date |
| --- | --- | --- |
| 14,488 | Great Britain | Nov. 26, 1885 |
| 202,473 | Great Britain | Aug. 23, 1923 |
| 318,282 | Great Britain | Sept. 2, 1929 |